US011078225B2

(12) United States Patent
Miettinen (10) Patent No.: US 11,078,225 B2
(45) Date of Patent: Aug. 3, 2021

(54) METHOD AND AN APPARATUS FOR FORMING A LIGNIN FRACTION, A LIGNIN COMPOSITION AND ITS USE

(71) Applicant: UPM-KYMMENE CORPORATION, Helsinki (FI)

(72) Inventor: Mauno Miettinen, Lappeeranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 15/577,624

(22) PCT Filed: May 26, 2016

(86) PCT No.: PCT/FI2016/050362
§ 371 (c)(1),
(2) Date: Nov. 28, 2017

(87) PCT Pub. No.: WO2016/193535
PCT Pub. Date: Dec. 8, 2016

(65) Prior Publication Data
US 2018/0162891 A1   Jun. 14, 2018

(30) Foreign Application Priority Data
May 29, 2015 (FI) ..................................... 20155411

(51) Int. Cl.
*C07G 1/00* (2011.01)
*B01J 37/36* (2006.01)
*B01J 31/00* (2006.01)
*B01J 31/02* (2006.01)
*C08H 7/00* (2011.01)

(52) U.S. Cl.
CPC .............. *C07G 1/00* (2013.01); *B01J 31/003* (2013.01); *B01J 31/0277* (2013.01); *B01J 37/36* (2013.01); *C08H 6/00* (2013.01)

(58) Field of Classification Search
CPC .... C07G 1/00; C08H 6/00; C08H 8/00; C08L 97/005
See application file for complete search history.

(56) References Cited

U.S. PATENT DOCUMENTS

| 2010/0081798 A1 | 4/2010 | Balensiefer | |
|---|---|---|---|
| 2011/0271875 A1 | 11/2011 | Ahmed | |
| 2012/0190092 A1 | 7/2012 | Jaquess | |
| 2012/0282465 A1* | 11/2012 | Kadam | C08H 6/00 428/402 |
| 2014/0109464 A1* | 4/2014 | Powell | C10G 3/50 44/307 |
| 2015/0041083 A1* | 2/2015 | Yoshikawa | C07G 1/00 162/19 |

FOREIGN PATENT DOCUMENTS

| CN | 103443284 A | 12/2013 | |
|---|---|---|---|
| CN | 103502383 A | 1/2014 | |
| CN | 103740326 A | 4/2014 | |
| EP | 2796561 A1 | 10/2014 | |
| JP | 2013241391 A | 12/2013 | |
| JP | 2015006998 A | 1/2015 | |
| RU | 2508301 C1 | 2/2014 | |
| WO | 2010045576 A2 | 4/2010 | |
| WO | WO 2012/056872 A1 | 5/2012 | |
| WO | 2013002708 A1 | 1/2013 | |
| WO | WO-2013094398 A1 * | 6/2013 | ............... C07G 1/00 |
| WO | 2013192572 A1 | 12/2013 | |
| WO | 2014143657 A1 | 9/2014 | |
| WO | WO-2014143657 A1 * | 9/2014 | ............. C07C 27/00 |

OTHER PUBLICATIONS

Atsushi Kato, Jun-ichi Azuma & Tetsuo Koshijima, "Isolation and Identification of a New Feruloyated Tetrasaccharide from Bagasse Lignin-Carbohydrate Complex Containing Phenolic Acid," 51 Agricultural and Biological Chemistry 1691 (1987).*
International Search Report from International Application No. PCT/FI2016/050362 dated Aug. 4, 2016.
Search Report from Finnish Patent Application No. 20155411 dated Dec. 21, 2015.
Yang, Q. et al., Analysis of wheat straw lignin by therogravimetry and pyrolysis-gas chromatography/mass spectrometry, J. Anal. Appl. Pyrolysis, vol. 87, 2010, 65-69.
Agblevor, F.A. et al., The Origins of Phenol Produced in the Rapid Hydrothermolysis and Alkaline Hydrolysis of Hybrid Poplar Lignins, Journal of Wood Chemistry and Technology, vol. 9, 1989, 167-188.
El-Shenawy, N.A. et al., Use of polymeric coagulants for increasing the efficiency of lignin separation from kraft and soda pulping black liquors of agricultural residues, Papel, vol. 69, 2008, 43-57.
Carrott, S.P.J.M et al., Lignin—from natural adsorbent to activated carbon: A review, Bioresource Technology, vol. 98, 2007, 2301-2312.
Office Action dated May 30, 2019 in Russian Patent Application No. 075990, with English translation (17 pages).
Russian Search Report in Russian Patent Application No. 075990, dated May 30, 2019, with English translation (4 pages).
Covey, G.; "Separation performance of centrifugal cleaners"; Appita Journal, vol. 62, No. 1, pp. 31-36; Jan. 2009 (7 pages).
"Basics in Minerals Processing: Size control—Hydrocyclone; Separation by flotation"; Metso Corporation; Edition 10, 4:10, 5:7; 2015 (4 pages).

(Continued)

*Primary Examiner* — Nicholas E Hill
(74) *Attorney, Agent, or Firm* — Nixon Peabody LLP (57) ABSTRACT

The invention relates to a method and an apparatus for forming a lignin fraction from crude lignin which has been processed by means of a treatment step selected from enzymatic treatment, treatment with ionic liquid and their combinations. The method comprises treating the crude lignin (1) by a lignin liberation in at least one lignin liberation step (3), and separating a lignin fraction (6) in at least one separation step (5). Further, the invention relates to a lignin composition and its use.

13 Claims, 4 Drawing Sheets

(56) References Cited

OTHER PUBLICATIONS

Yianatos, J. B.; "Column Flotation Modelling and Technology"; Chemical Engineering Dept., University of Santa Maria, Valparaiso, Chile; date unknown (31 pages).
Mathur, S. et al.; "Advances in selective flocculation technology for solid-solid separations"; Int. J. Miner. Proc. 58 (2000) 201-222 (22 pages).
Chinese Office Action in Chinese Patent Application No. CN 201680030997.2, dated Jul. 29, 2020 (26 pages).
Finnish Office Action in Finnish Patent Application No. FI 20186010, dated Oct. 28, 2020 (6 pages).
Finnish Search Report in Finnish Patent Application No. FI 20186010, dated Oct. 28, 2020 (2 pages).

\* cited by examiner

METHOD AND AN APPARATUS FOR FORMING A LIGNIN FRACTION, A LIGNIN COMPOSITION AND ITS USE

CROSS-REFERENCE TO RELATED APPLICATIONS

This application is a U.S. National Stage Application of International Application No. PCT/FI2016/050362, filed on May 26, 2016, which claims priority to Finnish Patent Application No. 20155411, filed on May 29, 2015, both of which are incorporated by reference herein in their entireties.

FIELD OF THE INVENTION

The invention relates to a method and an apparatus for forming a lignin fraction. Further, the invention relates to a lignin composition and its use.

BACKGROUND OF THE INVENTION

Known from prior art is different methods for forming lignin from different raw materials, such as biomass. Many bio-refinery processes, e.g. a hydrolysis, generate crude lignin, such as lignin residue, after the hydrolysis of the biomass. This water-insoluble lignin residue usually contains significant percentage of non-hydrolyzed lignocellulose particles.

Further, known from prior art is to treat lignin chemically by dissolving the lignin in a dissolvent, such as in NaOH, alcohol-water mixture or organic acid, and to precipitate the lignin, e.g. by sulphuric acid or water. Then the pure lignin can be provided, but known processes suffer from high operating and capital costs. Removing and/or recovering of the dissolvent or formed salt lead to additional costs. A final dewatering of the lignin is usually carried out by a filtration. Size of precipitated lignin particles are generally rather small, which has negative effect on a filtration rate and dry solids content of a filter cake.

OBJECTIVE OF THE INVENTION

The objective of the invention is to disclose a new method for forming a lignin fraction. Another objective of the invention is to disclose a new method for purifying lignin. Another objective of the invention is to produce a purified lignin composition with improved properties.

SUMMARY OF THE INVENTION

The method for forming a lignin fraction according to the present invention is characterized by treating crude lignin by a lignin liberation in at least one lignin liberation step and separating a lignin fraction in at least one separation step.

The apparatus for forming a lignin fraction according to the present invention is characterized by at least one liberation reactor for treating crude lignin by a lignin liberation, at least one separation device for separating the lignin fraction in at least one separation step, at least one first feeding device for feeding the crude lignin into the liberation reactor, and at least one second feeding device for feeding the treated crude lignin from the liberation reactor to the separation device.

The lignin composition according to the present invention is characterized by a lignin fraction that has been formed by treating crude lignin by a lignin liberation in at least one lignin liberation step and separating a lignin fraction in at least one separation step.

The use of the lignin composition including a lignin fraction that has been formed by treating crude lignin by a lignin liberation in at least one lignin liberation step and separating a lignin fraction in at least one separation step according to the present invention is characterized by the lignin composition being configured to be used as a component in a product selected from the group consisting of activated carbon, carbon fiber, lignin composite, binder material, polymers, resins, phenolic component, dispersion agent, feed, food or their combination or the lignin composition being configured to be used as an adsorbent for oil, hydrocarbon composition, or heavy metals.

BRIEF DESCRIPTION OF THE FIGURES

The accompanying drawings, which are included to provide a further understanding of the invention and constitutes a part of this specification, illustrate some embodiments of the invention and together with the description help to explain the principles of the invention. In the drawings.

DETAILED DESCRIPTION OF THE INVENTION

The invention relates to a method for forming a lignin fraction (6) from crude lignin (1), and preferably for purifying the crude lignin in order to form a pure lignin fraction. The crude lignin (1) has been processed by means of a treatment step (24) selected from enzymatic treatment, treatment with ionic liquid and their combinations. The method comprises treating the crude lignin (1) by a lignin liberation in at least one lignin liberation step (3) for liberating lignin of the crude lignin (1) so that the lignin is liberated for forming two solid phases, lignocellulose and free lignin particles, and separating a lignin fraction (6) by means of at least one separation step (5). In a preferred embodiment, the lignin fraction (6) is a purified crude lignin.

Figure 1:
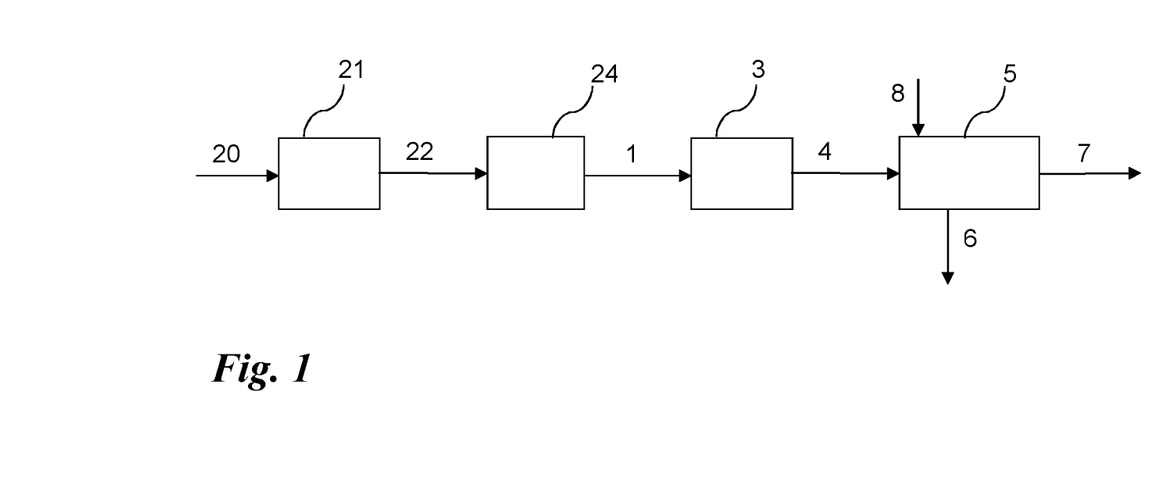
FIG. 1 is a flow chart illustration of a method according to one embodiment of the present invention.
Figure 2:
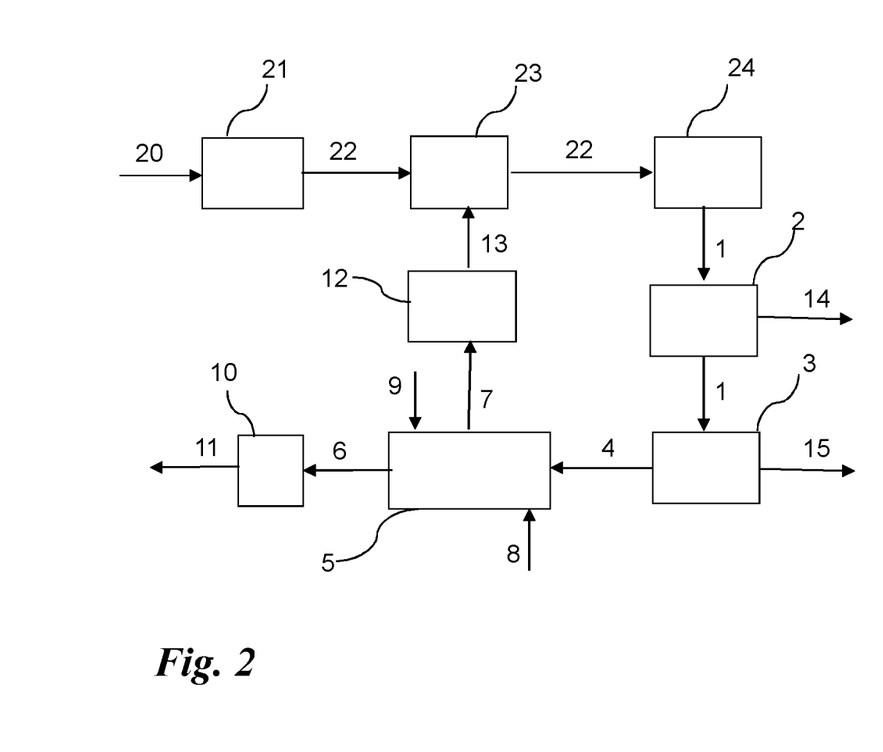
FIG. 2 is a flow chart illustration of a method according to another embodiment of the present invention.

One embodiment of the method of the present invention is shown in FIG. 1. Another embodiment of the method of the present invention is shown in FIG. 2.

The apparatus of the present invention comprises at least one liberation reactor (3) for liberating the crude lignin (1) in at least one liberation step, at least one separation device (5) for separating the lignin fraction (6) in at least one separation step, at least one first feeding device for feeding the crude lignin (1) into the liberation reactor (3), and at least one second feeding device for feeding the treated crude lignin (4) from the liberation reactor (3) to the separation device (5).

Preferably, the crude lignin (1) has been formed from starting material (20). In this context, starting material (20) means any wood or plant based raw material. The starting material may contain lignin, lignocellulose, cellulose, hemicellulose, glucose, xylose, extractives and other inherent structural components of biomass as well as foreign components such as enzymes or chemicals. In one embodiment, the starting material is selected from the group consisting of wood based raw material, woody biomass, lignin containing biomass such as agricultural residues, bagasse and corn stover, woody perennials, vascular plants, recycled brown board, deinking pulp and their combinations.

In this context, crude lignin (1) refers any material or composition containing lignin, substantially without free lignin. In one embodiment, the crude lignin contains below 20 wt-% free lignin. Further, the crude lignin contains also lignocellulose, which has glucan units. Lignocellulose, such as glucan units, and lignin are bound into each other in heterogenous structure meaning that typically lignin is not evenly distributed in the material. Mainly, the crude lignin comprises lignin and lignocellulose, but may contain also hemicelluloses. The crude lignin may contain one or more lignin material components. The crude lignin may contain different contents of lignin and glucan. Further, the crude lignin may contain enzymes, especially after an enzymatic treatment. Typically, the crude lignin is in the form of suspension which contains water, acid, e.g. formic acid, acetic acid or sulfuric acid, alcohol or other liquid, or in the form cake, lump or the like. In one embodiment, the crude lignin is in the form of suspension. Preferably, the crude lignin is a lignin residue from the hydrolysis, e.g. cellulignin.

In one embodiment, especially after the enzymatic treatment and/or treatment with ionic liquid, the crude lignin (1) contains high share carbohydrates in the form of solid lignocellulose. After the enzymatic treatment and/or treatment with ionic liquid lignin is tightly bound in lignocellulose of the crude lignin. Then further processing step is needed to liberate lignin. The separation of lignin particles can be facilitated by means of the invention. Preferably, the separation is based on a solid-solid separation. Simultaneously the crude lignin is purified to obtain lignin material more suitable for utilization in various applications. In the invention the lignocellulose fraction may be circulated back to the enzymatic treatment, such as enzymatic hydrolysis, and/or treatment with ionic liquid. An alternative option is to utilize the recovered lignocellulose fraction in an external application.

In one embodiment, the crude lignin has been diluted with liquid, e.g. with water. In one embodiment, WIS % (water insoluble solids) of the crude lignin is between 1-50%, or between 20-40%, in the liberation step. In one embodiment, WIS % (water insoluble solids) of the crude lignin is between 1-35%, or between 10-30%, or between 15-30%, in the separation step. Water insoluble solids, WIS %, can be calculated: WIS %=(weight of washed and dried material)/(weight of the wet slurry for washing). Low consistency of suspension aids mechanical separation of free lignin particles and lignocellulose particles. In one embodiment, weight average particle size of the crude lignin is below 1000 µm, preferably below 500 µm.

In one embodiment, the cellulose content, i.e. glucan content, of the crude lignin (1) is 3-70% by weight, preferably 5-60% by weight and more preferably 10-60% by weight, analyzed as glucose.

In one embodiment, the lignocellulose particles are in the form of fiber sticks in the crude lignin. In one embodiment, weight average particle size of the lignocellulose particle is below 1000 µm, in one embodiment below 500 µm and in one embodiment below 300 µm.

The crude lignin has been processed by means of an enzymatic treatment and/or treatment with ionic liquid (24). In one embodiment, the crude lignin has been processed by means of the enzymatic treatment and/or treatment with ionic liquid after the hydrolysis (21) in which the crude lignin has been formed from the starting material (20).

In one embodiment, the crude lignin has been processed by means of the enzymatic treatment (24). In one embodiment, the enzymatic treatment is an enzymatic hydrolysis. In one embodiment, the crude lignin has been formed from the starting material and processed by means of the enzymatic hydrolysis.

In one embodiment, the crude lignin (1) is treated by dewatering, washing, filtrating and/or centrifuging in at least one washing and separation step (2) before the lignin liberation (3). Preferably, the crude lignin (1) is washed and soluble carbohydrates are separated before the lignin liberation (3). Preferably, soluble carbohydrates, such as soluble $C_6$ carbohydrates, (14) can be separated from the crude lignin during the washing and separation step (2). In one embodiment, the apparatus comprises at least one device, e.g. a filter or centrifuge, for treating the crude lignin (1) by dewatering, washing, filtrating and/or centrifuging in at least one washing and separation step (2) before the lignin liberation (3).

In one embodiment, the crude lignin (1) is treated by liberating in the presence of acid. In one embodiment, the crude lignin (1) is treated by liberating without acid. In one embodiment, the crude lignin (1) is liberated by means of a heat treatment, such as hydrothermal treatment, in the lignin liberation step (3). In one embodiment, the crude lignin is liberated by means of an autohydrolysis. In one embodiment, the crude lignin is liberated by means of a dilute acid hydrolysis. In one embodiment, the crude lignin is liberated in two stages. In one embodiment, one stage is performed without acid and another stage with acid. In one embodiment, the liberation reactor (3) is a digester. In one embodiment, the liberation reactor (3) is a glass-lined digester, e.g. a batch glass-lined digester, or a standard continuous digester. In one embodiment, the liberation reactor (3) is a continuous pipe reactor with short retention time and involving sudden release of pressure after reactor phase. In one embodiment, the liberation reactor (3) is a percolation or flow-through reactor.

In one embodiment, temperature is 130-400° C. during the lignin liberation (3). In one embodiment, temperature is at least 170° C. during the lignin liberation (3). In one embodiment, temperature is 170-240° C. during the lignin liberation (3). In the liberation, free lignin is liberated from the crude lignin and two solid phases, lignocellulose and free lignin particles, are formed. In one embodiment, when the crude lignin is treated by liberating, a steam explosion effect is achieved during the lignin liberation to aid formation of the free lignin particles and to decrease particle sizes of the lignocellulose particles. The most effective lignin liberation is accomplished by short retention time in high temperature, i.e. to produce so called flash effect for liberating lignin. Properties of the crude lignin, target properties for the purified lignin and lignocellulose fraction as well as economical and ecological values set the optimal process conditions.

In one embodiment, water is added before the lignin liberation (3). Temperature of water may be about 20-100° C.

In one embodiment, the apparatus comprises at least two parallel liberation reactors (3) for liberating lignin of the crude lignin (1). Preferably, the parallel reactors facilitate the continuous process. In one embodiment, the apparatus comprises at least two sequential liberation reactors (3) for liberating lignin of the crude lignin (1).

In one embodiment, the severity of the liberation treatment is between standard hemicellulose ($C_5$) and cellulose ($C_6$) hydrolysis, so the lowest possible severity to liberate lignin. Typical pH adjusted combined severity (CS) or severity index (SI) is between 1.5 and 2.5 (defined by an equation presented below), where t is time in minutes and T is temperature in degrees Celsius.

$$\log(CS) = \log\left[t\exp\left(\frac{T-100}{14.75}\right)\right] - pH$$

The low severity is advantageous in order to dissolve as low percentage of cellulose as possible, since this improves $C_6$-carbohydrate yield in an enzymatic process. Additional benefits are preservation of natural reactivity of the lignin and higher selectivity of the liberation treatment leading to cleaner sugar solution.

In one embodiment, below 70%, preferably below 60%, more preferably below 50% and most preferably below 40%, of glucan is dissolved during the lignin liberation (3).

Figure 3A:
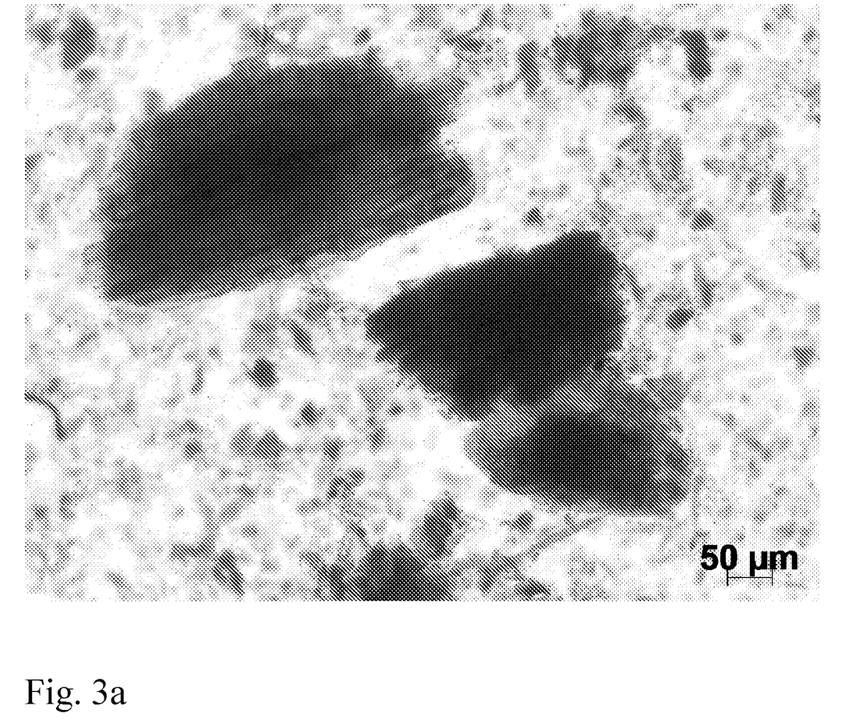
FIG. 3a shows the crude lignin before the liberation.
Figure 3B:
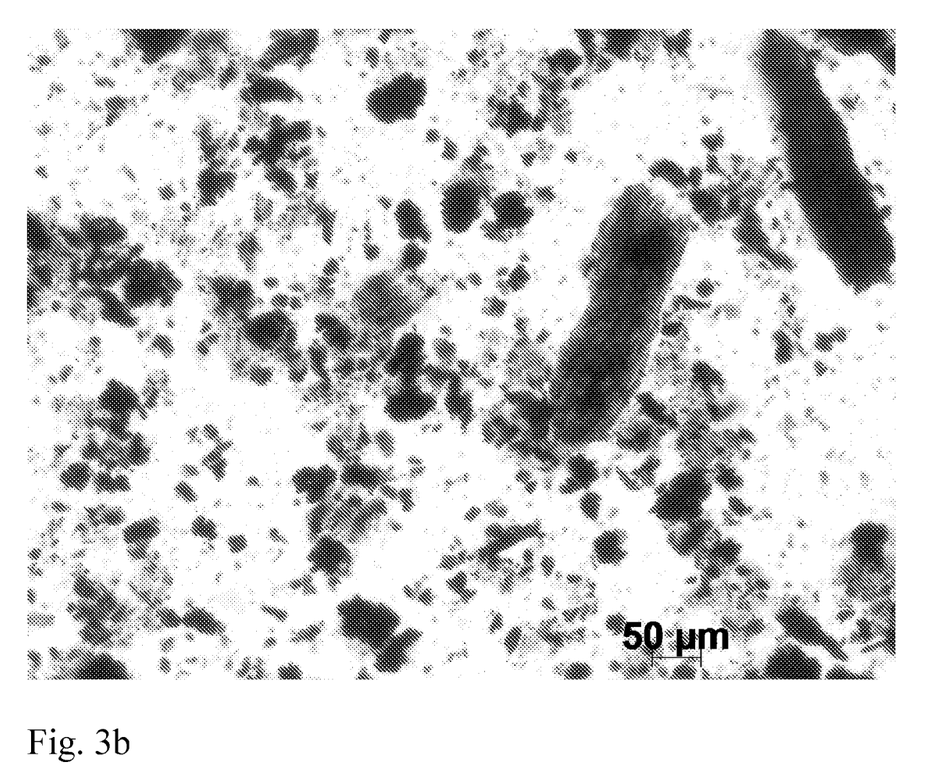
FIG. 3b shows the crude lignin after the liberation.

FIG. 3a presents one embodiment of the crude lignin before the lignin liberation, and FIG. 3b presents one embodiment of the crude lignin after the lignin liberation. Darker round shapes in FIG. 3b are liberated lignin particles and lighter colour material is lignocellulose.

In one embodiment, cooking liquor from the lignin liberation may be removed during or after the lignin liberation. Soluble carbohydrates of the cooking liquor may be recovered. Alternatively the cooking liquor may be supplied to a waste water treatment plant as such or after a subsequent treatment.

In one embodiment, carbonate is added before the lignin liberation. In one embodiment, carbonate is added during the lignin liberation. In one embodiment, carbonate is in the form of sodium carbonate, sodium bicarbonate, carbon dioxide, other suitable carbonate or their derivatives or their combinations. Lignin particle size can be increased by means of adding the carbonate. When $CO_2$ is generated during the liberation step, softened lignin particles swell due to expanding gas inside the pores. Then lignin particles with increased particle size can be separated more easily from the crude lignin.

In one embodiment, the treated crude lignin (4) is cooled after the lignin liberation (3).

In one embodiment, the treated crude lignin (4) is washed after the lignin liberation (3).

In one embodiment, the lignin fraction (6) is separated in one or more separation step (5), after the lignin liberation step (3). In one embodiment, the lignocellulose fraction (7) is separated in one or more separation step (5). In one embodiment, the separation is carried out by means of a mechanical separation. In one embodiment, a separation method is selected from the group consisting of centrifugal forces, sedimentation, elutriation, filtration, flotation, screening and their combinations. In one embodiment, the separating is made by means of centrifugal forces. In one embodiment, the separating is made by means of sedimentation. In one embodiment, the separating is made by means of elutriation. In one embodiment, the separating is made by means of filtration. In one embodiment, the separating is made by means of flotation. In one embodiment, the separating is made by means of screening. In one embodiment, each separation step is made by similar methods. Alternatively, every separation step is made by different methods. In one embodiment, the lignin fraction (6) is separated from the treated crude lignin (4) so that remaining crude lignin is the lignocellulose fraction (7). In one embodiment, the lignocellulose fraction (7) is separated from the treated crude lignin (4) so that remaining crude lignin is the lignin fraction (6). Preferably, the lignin fraction (6) is the purified lignin.

In one embodiment, the apparatus comprises at least one separation device (5) for separating the lignin fraction (6) from the treated crude lignin (4), and preferably for purifying the lignin fraction (6). In one embodiment, the apparatus comprises at least two separation devices (5). In one embodiment, the separation device is based on centrifugal forces, sedimentation, elutriation, filtration, flotation, screening or their combinations. The separation device may be reactor, vessel, tank, bowl, cyclone, filter, column, cell, basin, thickener or the like. In one embodiment, at least one separation step for separating the lignin fraction is made by means of centrifugal forces, e.g. by basket centrifuge or decanter centrifuge such as solid bowl centrifuge, or flotation, e.g. by froth flotation or column flotation.

In one embodiment, the separation of the lignin fraction (6) is carried out in one or more separation step. In one embodiment, the separation is carried out in one separation step. In one embodiment, the separation is carried out in more than one separation step. In one embodiment, the separation is carried out in three separation steps. In one embodiment, the separation device (5) comprises one or more separation step. In one embodiment, the separation step comprises one or more separation device. In one embodiment, the lignin fraction (6) is separated in the last separation step. In one embodiment, the lignin fraction (6) is separated between two separation steps. In one embodiment, the lignin fraction (6) is separated in the first separation step. In one embodiment, the lignin fraction (6) is separated in the first separation step and after that the lignin fraction is purified the later separation steps. In one embodiment, the lignin fraction (6) is separated in each separation steps. In one embodiment, the lignocellulose fraction (7) is separated in the first separation step. In one embodiment, the lignocellulose fraction (7) is separated in more than one separation step. In one embodiment, the lignocellulose fraction (7) is separated in each separation steps. In one embodiment, at least one separated lignocellulose flow is circulated to a desired step of the separation.

In one embodiment, the lignin fraction (6) is further purified by screening, preferably by vibrating screen, to remove char and sugar decomposition products.

The separation can be carried out in wide temperature range, e.g. at temperatures between 0-100° C. Higher temperature usually aids the separation due to lower viscosity. Generally near natural process temperature is utilized to avoid heating or cooling.

In one embodiment, a stabilizing chemical (8) is added into the treated crude lignin (4) in connection with the separation step (5). In one embodiment, the stabilizing chemical (8) is added into the treated crude lignin (4) before the separation step (5). In one embodiment, the stabilizing chemical (8) is added into the treated crude lignin (4) during the separation step (5). In one embodiment, the apparatus comprises at least one feeding device for adding a stabilizing chemical (8) into the treated crude lignin (4).

The stabilizing chemical (8) is added into the treated crude lignin (4) in at least one step. In one embodiment, the stabilizing chemical (8) is added into the treated crude lignin (4) in one step. In one embodiment, the stabilizing chemical (8) is added into the treated crude lignin in more than one step. In one embodiment, the stabilizing chemical (8) is added into the treated crude lignin in connection with each separation step. In one embodiment, the stabilizing chemical (8) is added into the treated crude lignin in the first separation step and/or in at least one later separation step. Preferably, the chemical stabilization and mechanical separation are made.

In one embodiment, the stabilizing chemical is added into the treated crude lignin and the crude lignin is mixed, preferably by high-shear mixing. The high-shear mixing is beneficial to facilitate adsorption of chemical on surfaces. The stabilizing chemical predominantly adsorbs on lignocellulose particles.

In one embodiment, the stabilizing chemical (8) is polysaccharide as such or modified polysaccharide. In this context, the stabilizing chemical is typically hydrophilic chemical. In one embodiment, the stabilizing chemical is selected from the group consisting of carboxymethyl cellulose (CMC), polyanionic cellulose (PAC), other cellulose derivatives, e.g. ethylhydroxyethyl cellulose and methyl cellulose, guar gum, such as native guar gum or modified guar gum, native starch, modified starch, pectin, glycogen, callose, chrysolaminarin, native hemicellulose, modified hemicellulose, xylan, mannan, galactomannan, galactoglucomannan (GGM), arabinoxylan, glucuronoxylan and xyloglucan, fucoidan, dextran, alginate, other polysaccharide and their combinations. Said stabilizing chemical may be in native form or in modified form. In one embodiment, the stabilizing chemical is carboxymethyl cellulose (CMC). In one embodiment, the stabilizing chemical is guar gum. Preferably, function of the stabilizing chemical is to keep suspended lignocellulose particles stable through chemical interaction. Therefore, treated lignocellulose particles remain in suspension while free lignin particles are separated from suspension.

In one embodiment, washing water (9), e.g. at temperature between 20-70° C., may be added into the separation device (5), preferably in the last separation step, for washing the lignin fraction (6). Alternatively, the lignin fraction (6) is washed after the separation (5). In one embodiment, the lignin fraction is washed by a displacement washing. The purified lignin can be easily neutralized in washing stage without negatively affecting dewatering performance. In this context, the washing water means any washing liquid or washing water. The washing water may be fresh washing water or recycled washing water. Washing water can be physically and/or chemically cleaned raw water as well as clean side stream from biorefinery process, e.g. condensate from evaporation of sugar. The separation process does not require ultra clean water, e.g. obtainable by ion exchange, distillation or reverse osmosis.

In one embodiment, the lignin fraction (6) is in the form of suspension, solid, sediment, sludge, cake or the like after the separation step. The lignin fraction (6) may contain also other components or agents than lignin particles. Preferably, the lignin fraction contains free lignin. In one embodiment, the lignin fraction contains over 80%, preferably over 85%, more preferably over 90%, most preferably over 95%, lignin and below 20%, preferably below 15%, more preferably below 10%, most preferably below 5%, glucan. Lignin content is specified to be combination of acid-insoluble and acid-soluble lignin.

In one embodiment, the lignin fraction (6) is treated after the separation by dewatering the lignin fraction in at least one dewatering step (10) which may be selected from the separation methods described above or other suitable methods. In one embodiment, the dewatering is carried out in the separation step. In one embodiment, the lignin fraction (6) is treated by dewatering in at least one filtration step, e.g. by a pressure filter or vacuum filter. In one embodiment, the lignin fraction (6) is treated by dewatering in at least one cleaning separation step. In one embodiment, the lignin fraction is treated in the cleaning separation step by means of centrifugal cleaning e.g. by hydrocyclone, sedimentation, e.g. by thickener, elutriation, aggregation, flotation, flocculation and/or screening. In one embodiment, the lignin fraction (6) is treated by grinding.

In one embodiment, the apparatus comprises at least one filtration device, e.g. a pressure filter or vacuum filter, for filtering and purifying the lignin fraction (6). In one embodiment, the apparatus comprises at least one dewatering device for dewatering the lignin fraction (6).

The dewatering of the lignin can be improved by means of the present invention. Removal of the lignocellulose particles clearly improves the dewatering of the lignin, evidenced by increased filtration rate and/or higher solids content. The higher solids content means that the lignin is more suitable for downstream applications as such and less energy is needed in drying.

In one embodiment, at least a part of the lignocellulose fraction (7) including lignocellulose particles is circulated back to the enzymatic treatment, such as enzymatic hydrolysis, and/or treatment with ionic liquid. In one embodiment, at least a part of the lignocellulose fraction (7) is circulated from the separation step (5) to the enzymatic treatment, such as enzymatic hydrolysis, and/or treatment with ionic liquid. In one embodiment, at least a part of the lignocellulose fraction (7) is circulated to a stage before treatment step (24), preferably before the enzymatic treatment or treatment with ionic liquid. In one embodiment, the lignocellulose fraction (7) is circulated to a stage between the hydrolysis process (21) and treatment step (24). In one embodiment, the lignocellulose fraction (7) is circulated into a re-slurry tank (23) which is arranged prior the treatment step (24). Alternatively, at least a part of the lignocellulose fraction (7) may be circulated to a separate hydrolysis process. In one embodiment, the apparatus comprises a circulation means for circulating the lignocellulose fraction (7). In one embodiment, a feeding system is used for circulating the lignocellulose fraction (7) from the separation device (5) to the enzymatic treatment, such as enzymatic hydrolysis, and/or treatment with ionic liquid.

Preferably, in the case of enzymatic process, the raw material, e.g. wood material, can be more effectively utilized in the process when the lignocellulose fraction (7) is recirculated to the enzymatic treatment, such as enzymatic hydrolysis.

When the lignocellulose fraction (7) is circulated, the conversion may be lowered in the enzymatic treatment or treatment with ionic liquid. In one embodiment, the conversion is lowered by at least 10%, or by at least 20%, of the prior optimal conversion level. An enzyme dosage is chosen so that desired glucan to glucose conversion is achieved in the enzymatic treatment. The lower conversion enables decrease in the enzyme dosage. Properties of the circulated lignocellulose fraction, especially small particle size, low hemicellulose content and low lignin content, potentially decrease the enzyme dosage further. In one embodiment, feed consistency can be increased in the enzymatic treatment. This compensates otherwise lower sugar concentration and higher volume of the enzymatic treatment tanks, such as enzymatic hydrolysis tanks, when the lower conversion is applied. The higher feed consistency is facilitated by lower viscosity of mixture of pretreated starting material and lignocellulose in comparison with pretreated starting material alone. In conventional process the lower conversion would result in equivalent drop in $C_6$-sugar yield, but when the recovered lignocellulose fraction is circulated to the enzymatic hydrolysis the combined $C_6$-yield is typically higher than in a reference case with normal conversion level.

The lignocellulose fraction (7) may contain also other components or agents than carbohydrates, such as glucan. In one embodiment, the lignocellulose fraction (7) is in the form of suspension. This suspension contains liquid, such as water. In one embodiment, lignocellulose fraction (7) contains 40-90%, preferably 50-90%, more preferably about 60-90%, glucan and 10-60%, preferably 10-50%, more preferably about 10-40%, lignin after the separation step (5).

In one embodiment, the lignocellulose fraction (7) is dewatered, e.g. by filtering, after the separation (5).

In one embodiment, the lignocellulose fraction (7) is diluted for forming a diluted lignocellulose fraction (13) after the separation step (5). In one embodiment, liquid in the lignocellulose fraction replaces partly or totally fresh water needed in dilution of pretreated starting material prior to enzymatic hydrolysis.

According to present invention a lignin composition can be formed. The lignin composition includes lignin fraction which has been formed by the method described in this context. The lignin composition may be used as component in manufacturing a product, such as a final product, selected from the group consisting of activated carbon, carbon fiber, lignin composite, binder material, polymers, resins, phenolic component, dispersion agent, feed, food or their combination. In one embodiment, the lignin composition is used as an adsorbent for oil, hydrocarbon composition or heavy metals. In one embodiment, the lignin composition is used as combustible matter in energy production.

In one embodiment, a lignocellulose composition can be formed. The lignocellulose composition includes lignocellulose fraction which has been formed by the method described in this context. The lignocellulose composition may be used as component in manufacturing a product selected from the group consisting of composites, wood composites, lignin-wood composites, wood-plastic composites comprising composites formed from plastic, synthetic polymers, biopolymers, rubber or their combinations together with wood, resins, preferably as filler in resins, wood based materials, wood based fillers, construction materials, building boards, glue boards and/or other wood based boards, such as a particle board, an oriented strand board, a chip board, an intrallam, a gluelam, a hardboard, a corrugated board, a wafer board, a fiber board, a plywood, an insulation material, a packaging material, a barrier material or a foam material. In one embodiment, the lignocellulose composition is used as combustible matter in energy production. In one embodiment, the lignocellulose composition is used as raw material in a production of microcrystalline cellulose, nanocrystalline cellulose or nanofibrillated cellulose. High crystallinity index and small particle size promote usage of the lignocellulose in the production of microcrystalline cellulose or nanocrystalline cellulose.

In the present invention the separation of the lignin fraction may be optimized. The method according to the present invention provides the lignin fraction and lignin composition with good quality. Especially, purity of the lignin fraction can be improved. When improving purify of the lignin and increasing dry solids content in the lignin fraction so then it may be provided better properties of the final product. Further, the lignocellulose fraction can be recovered. Thanks to the invention usage of raw materials and enzymes can be reduced. The invention provides feasible way to lower conversion in the enzymatic treatment, such as in the enzymatic hydrolysis (EH), without having negative impact on sugar yield, sugar concentration or size of enzymatic hydrolysis tanks. Further, $C_6$-sugar yield can be improved in the process.

Thanks to the invention, preferably improved filterability is achieved. Further, thanks to the invention heat value of the lignin composition can be increased so that the heat value without drying may improve at least 50%.

The present invention provides an industrially applicable, simple and affordable way of making the purified lignin based composition and also the lignocellulose based composition. The method according to the present invention is easy and simple to realize as a production process. The method according to the present invention is suitable for use in the manufacture of the different lignin and lignocellulose based products and final products from different starting materials. Preferably, the crude lignin is purified by separating the lignocellulose particles. Further, the lignin composition can be used as sources of energy.

EXAMPLES

The invention is described in more detail by the following examples with reference to accompanying drawings.

Example 1

In this example a lignin fraction (6) is formed according to a process of FIG. 1.

The pretreated starting material is formed from starting material (20), such as biomass, by means of for example hemihydrolysis (21). The formed pretreated starting material (22) is processed in a treatment step (24) which is an enzymatic treatment, such as an enzymatic hydrolysis, or treatment with ionic liquid in order to form the crude lignin (1).

The crude lignin (1) is fed by means of a first feeding device into a liberation reactor (3), e.g. into a digester, preferably based on autohydrolysis or dilute acid hydrolysis, for treating the crude lignin by a liberation. Water may be added into the liberation reactor (3).

The treated crude lignin (4) is fed by means of a second feeding device from the liberation reactor (3) into the separation device (5) for separating a lignin fraction (6). Carboxymethyl cellulose (8) may be added as a stabilizing chemical into the crude lignin during the separation. Preferably, the separation is carried out in more than one separation step. The lignin fraction (6) from the separation device (5) is recovered. Also a lignocellulose fraction (7) is separated. The lignocellulose fraction (7) may be circulated back to the enzymatic treatment, such as enzymatic hydrolysis, or treatment with ionic liquid.

Example 2

In this example a lignin fraction (6) is formed according to a process of FIG. 2.

The pretreated starting material is formed from starting material (20), such as biomass, by means of for example hemihydrolysis (21). The formed pretreated starting material (22) is fed via a re-slurry tank (23) to a treatment step (24) which is an enzymatic treatment, such as an enzymatic hydrolysis, or treatment with ionic liquid. The pretreated starting material (22) is processed in the treatment step (24) in order to form the crude lignin (1).

The crude lignin (1) is filtrated in a filtration device (2) in which soluble carbohydrates (14) may be removed. Optionally the crude lignin can be washed with water during or after filtration, preferably using displacement washing. After that the crude lignin (1) is fed by means of a first feeding device into a liberation reactor (3), e.g. into a digester, preferably based on autohydrolysis or dilute acid hydrolysis, for treating the crude lignin by a liberation. Preferably, the apparatus comprises a steam explosion stage in the end. Water may be added into the liberation reactor. Liquid phase containing solubilised carbohydrates (15) may be separated during or after the liberation. Preferably, the treated crude lignin (4) is washed after the lignin liberation.

The treated crude lignin (4) is fed by means of a second feeding device from the liberation reactor (3) into the optional washing stage and further to separation device (5) for separating a lignin fraction (6). Also a lignocellulose fraction (7) is separated. Carboxymethyl cellulose (8) may be added as a stabilizing chemical into the crude lignin during the separation. Preferably, the separation is carried out in more than one separation step. Washing water (9), e.g. at temperature between 20-60° C., may be added into the separation device (5), preferably in the last separation step, for washing the lignin fraction (6). The lignin fraction (6) from the separation device (5) is fed to the second filtration unit (10) for further treating the lignin fraction (6), e.g. by a pressure filter. The lignin fraction (6) can be filtrated and purified for forming a final lignin composition (11).

The lignocellulose fraction (7) is circulated back to the enzymatic treatment, such as enzymatic hydrolysis, or treatment with ionic liquid. The lignocellulose fraction (7) may be diluted in a dilution step (12) for forming a diluted lignocellulose fraction (13). The diluted lignocellulose fraction (13) is fed the re-slurry tank (23) and circulated to the treatment step (24).

Example 3

In this example, lignin and lignocellulose fractions were formed.

Pre-treated biomass (PTB) was subjected to an enzymatic hydrolysis with a commercial enzyme using 16% TS (total solids) feed. An enzyme dosage was chosen so that 80% glucose conversion was achieved after h hydrolysis time. Residual solid material, i.e. crude lignin, was separated from $C_6$-carbohydrates by a pressure filtration. The crude lignin was exposed to dilute acid treatment in a liberation step. The crude lignin was liberated in a digester using following conditions: 20.9% TS, time 210 min, temperature 181° C. and sulphuric acid dosage 6 kg/t TS PTB. After the liberation treatment slurry was cooled down in the reactor. After cooling pH of slurry was 3.0.

A pressure filtration and displacement washing was used to separate water soluble material from solid particles. The liberated lignin particles and residual lignocellulose particles were separated sequentially in four stages. The first stage (rougher stage) provided a lignocellulose fraction and a semi-purified lignin fraction. The following stages (cleaner stages) were used to further purify the lignin fraction. The standard procedure was to circulate lignocellulose fractions from stages 2-4 upstream to optimal stages in the separation process. Optionally there can be one or several stages to further purify the lignocellulose fraction (scavenger stages). The treated crude lignin was re-slurried to provide 7% TS feed for the rougher stage. CMC (carboxymethyl cellulose) was added 10 kg/t TS, and temperature was 55° C. The slurry was pumped through GEA Westfalia UCD205 decanter centrifuge at feed rate of 23 kg/min using bowl speed of 2800 rpm. Separated lignin (heavy) fraction was further re-slurried, CMC was added 3 kg/t TS, and the formed slurry was processed in the first cleaner stage using a decanter centrifuge. Two subsequent cleaner stages were based on sedimentation. CMC was added 1.5 kg/t TS in the second cleaner stage, and the third cleaner stage was performed without CMC. Underflow was collected after 2 h sedimentation time in the both stages.

Lignin and carbohydrates were analysed using TAPPI-methods T-222 and T-UM 250. Results are presented in table 1.

TABLE 1

| Component | Unit | PTB | CL1 | CL2 | LC/SS1 | L/SS4 |
|---|---|---|---|---|---|---|
| Acid-insoluble lignin | % | 30.7 | 69.8 | 79.0 | 38.9 | 86.8 |
| Acid-soluble lignin | % | 2.2 | 1.9 | 2.1 | 3.8 | 1.0 |
| Glucose | % | 57.6 | 25.8 | 22.8 | 53.9 | 11.7 |
| Xylose | % | 9.1 | 1.2 | <0.2 | <0.2 | <0.2 |

CL1 = crude lignin before digester
CL2 = crude lignin after digester
LC/SS1 = lignocellulose fraction after separation stage 1
L/SS4 = lignin fraction after separation stage 4

15% of glucan was hydrolysed (solubilised) during the liberation step meaning that 85% of glucan is available for the enzymatic hydrolysis after 100% recovery in the separation stage. The lignin fraction L/SS4 was significantly cleaner than the crude lignin after the digester (CL2) demonstrating that lignin is at least partially liberated from the crude lignin during the dilute acid hydrolysis. Mechanical separation is not able to purify the crude lignin before the digester. Large biomass particles present in PTB complicated purification of the lignin, since bigger lignocellulose particles tend to drift into the heavy fraction (lignin fraction). For this reason a hot blow, e.g. a steam explosion, after the liberation step is a preferred option providing a practical way to decrease particle size. More severe conditions leading to higher degree of the glucan hydrolysed would significantly contribute to the lignin liberation and consequent separation.

The laboratory scale enzymatic hydrolysis was performed for the mixture of the PTB and circulated lignocellulose LC/SS1 with ratio 87:13 on total solids basis. Reference was a similar enzymatic hydrolysis with 100% PTB material. Results are presented in table 2.

TABLE 2

|  | REF A | 87:13 A | REF B | 87:13 B |
|---|---|---|---|---|
| Enzyme dosing on TS, % | 3 | 3 | 4 | 4 |
| Conversion after 24 hours, % | 59 | 58 | 64 | 71 |
| Conversion after 48 hours, % | 68 | 73 | 79 | 78 |
| Conversion after 72 hours, % | 69 | 72 | 78 | 82 |

Results indicate that recycled lignocellulose (glucan) was converted to glucose as efficiently as virgin PTB.

Example 4

In this example, an effect of a circulated lignocellulose fraction on rheology of formed slurry was demonstrated. The separated lignocellulose fraction from example 3 was used in the experiment. Pretreated biomass (PTB material) was re-slurried with the lignocellulose material to provide a suspension having total solids (TS) of 16.8% and water-insoluble solids content (WIS) of 16.5%. Ratio of the PTB and circulated lignocellulose was set to 70:30 on total solids basis. Viscosity of suspension was 306 mPas (Brookfield 50 rpm). As a reference the same pretreated biomass (PTB) was re-slurried with clean water to provide a suspension having total solids (TS) of 16.8% and water-insoluble solids content (WIS) of 16.5%. Viscosity of suspension was 1876 mPas (Brookfield 50 rpm). This example demonstrates that the mixing of the lignocellulose with the pretreated biomass leads to unexpected rheological properties. This addresses mainly the effect of the bipolar particle size distribution, but also altered surface properties may play a role. Lower viscosity enables use of higher solids content, for example when the enzymatic hydrolysis is performed with low conversion, i.e. low carbohydrate yield, thus enabling compensation for otherwise lowered sugar concentration and increased tank volume. Even if there is no benefit to reach higher solids content lower viscosity facilitates use of a less intensive mixing stage.

The method according to the present invention is suitable in different embodiments to be used for forming lignin fractions and lignocellulose fractions from the most different kinds of crude lignin.

The invention is not limited merely to the example referred to above; instead many variations are possible within the scope of the inventive idea defined by the claims.

The invention claimed is:

1. A method for forming a lignin fraction from crude lignin wherein the method comprises:
    forming crude lignin using enzymatic treatment, treatment with ionic liquid, or the combination thereof;
    treating the crude lignin by a lignin liberation at a temperature of at least 170° C. in at least one lignin liberation step, wherein the lignin is liberated using a dilute acid hydrolysis and a steam explosion and wherein two solid phases are formed; and
    separating a lignin fraction and a lignocellulose fraction in at least one solid-solid separation step after the lignin liberation.

2. The method of claim 1, wherein the cellulose content of the crude lignin is between about 10-60% by weight.

3. The method according to claim 1, wherein below 70% of glucan is dissolved during the lignin liberation.

4. The method according to claim 1, wherein the crude lignin is treated by dewatering, washing, filtrating, centrifuging, or a combination thereof in at least one washing and separation step before the lignin liberation.

5. The method according to claim 1, wherein the separating the lignin fraction and the lignocellulose is carried out in more than one separation step.

6. The method according to claim 1, wherein a stabilizing chemical is added into the treated crude lignin in connection with the act of separating the lignin fraction and the lignocellulose fraction.

7. The method according to claim 6, wherein the stabilizing chemical includes carboxymethyl cellulose (CMC) or guar gum.

8. The method according to claim 1, wherein at least a part of the lignocellulose fraction is recirculated to the enzymatic treatment, the treatment with ionic liquid, or the combination thereof.

9. The method of claim 1, further comprising forming a lignin composition including the lignin fraction.

10. The method of claim 9, wherein the lignin composition is configured to be used as a component in a product selected from the group consisting of activated carbon, carbon fiber, lignin composite, binder material, polymers, resins, phenolic component, dispersion agent, feed, food or their combination.

11. The method of claim 9, wherein the lignin composition is configured to be used as an adsorbent for oil, hydrocarbon composition, or heavy metals.

12. The method of claim 1, further comprising forming a lignocellulose composition including the lignocellulose fraction.

13. The method of claim 12, wherein the lignocellulose composition is configured to be used as a component in a product selected from the group consisting of composites, wood composites, lignin-wood composites, wood-plastic composites, resins, wood based materials, wood based fillers, construction materials, building boards, glue boards and/or other wood based hoards, or as combustible matter, or as raw material in a production of microcrystalline cellulose, nanocrystalline cellulose or nanofibrillated cellulose.

* * * * *

UNITED STATES PATENT AND TRADEMARK OFFICE
CERTIFICATE OF CORRECTION

PATENT NO. : 11,078,225 B2  
APPLICATION NO. : 15/577624  
DATED : August 3, 2021  
INVENTOR(S) : M. Miettinen Page 1 of 1

It is certified that error appears in the above-identified patent and that said Letters Patent is hereby corrected as shown below:

In the Claims

Column 14, Line 38 (Claim 13), please delete "hoards" and insert --boards-- therefor.

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*